United States Patent
Lu et al.

(10) Patent No.: US 12,126,816 B2
(45) Date of Patent: Oct. 22, 2024

(54) TECHNIQUES FOR IMAGE DATA COMPRESSION AUTOMATION

(71) Applicant: BAE SYSTEMS Information and Electronic Systems Integration Inc., Nashua, NH (US)

(72) Inventors: Chien-Horn Lu, Amherst, NH (US); Mark Hess, San Francisco, CA (US); William G. Tian, Campbell, CA (US); Angel Lopez, Newark, CA (US); Edmond Tam, Fremont, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 98 days.

(21) Appl. No.: 18/174,299

(22) Filed: Feb. 24, 2023

(65) Prior Publication Data
US 2024/0292002 A1     Aug. 29, 2024

(51) Int. Cl.
| G06K 9/36 | (2006.01) |
| G06K 9/46 | (2006.01) |
| H04N 19/167 | (2014.01) |
| H04N 19/30 | (2014.01) |
| H04N 23/80 | (2023.01) |

(52) U.S. Cl.
CPC .......... *H04N 19/167* (2014.11); *H04N 19/30* (2014.11); *H04N 23/80* (2023.01)

(58) Field of Classification Search
None
See application file for complete search history.

(56) References Cited

U.S. PATENT DOCUMENTS 6,091,777 A    7/2000 Guetz et al.
6,636,229 B2*  10/2003 Ishikawa ............... H04N 5/202
                                                 345/596

(Continued)

FOREIGN PATENT DOCUMENTS

EP    1075146 A3    7/2002
EP    1351517 A3    1/2004

(Continued)

OTHER PUBLICATIONS

International Search Report, PCT/US24/16454, mailed May 15, 2024, 7 pages.

*Primary Examiner* — Feng Niu
(74) *Attorney, Agent, or Firm* — Scott J. Asmus

(57) ABSTRACT

Techniques to provide compression and/or decompression. A method includes obtaining a first set of control points specifying a first set of compression ratios corresponding to respective first regions of a compression domain, and minimum and maximum uncompressed values within the compression domain. The method can further include scaling the first set of control points based on the minimum and maximum uncompressed values to obtain a scaled set of control points, wherein a first scaled control point is located at the minimum uncompressed value, and a last scaled control point is located at the maximum uncompressed value. The method can further include adjusting at least one scaled control point such that a first slope does not exceed 1. The method can further include compressing or decompressing between the compression domain and a range of compressed values, wherein a respective compression ratio corresponds to a respective slope of the set of slopes.

18 Claims, 9 Drawing Sheets

(56) References Cited

U.S. PATENT DOCUMENTS

| | | | |
|---|---|---|---|
| 7,304,482 B1 * | 12/2007 | Kay | G09G 3/006 |
| | | | 382/300 |
| 7,751,475 B1 | 7/2010 | Crandall et al. | |
| 7,843,493 B2 * | 11/2010 | Katagiri | H04N 23/70 |
| | | | 348/222.1 |
| 8,023,748 B2 * | 9/2011 | Kato | H04N 19/98 |
| | | | 385/138 |
| 8,176,524 B2 | 5/2012 | Singh et al. | |
| 8,194,987 B2 | 6/2012 | Govindaswamy et al. | |
| 8,228,397 B2 * | 7/2012 | Katagiri | H04N 23/70 |
| | | | 358/521 |
| 8,233,727 B2 | 7/2012 | Wang et al. | |
| 8,358,858 B2 | 1/2013 | Wang | |
| 8,433,120 B2 * | 4/2013 | Huo | G06T 5/92 |
| | | | 705/3 |
| 8,478,059 B2 | 7/2013 | Wang et al. | |
| 8,798,384 B2 | 8/2014 | Le et al. | |
| 9,024,961 B2 * | 5/2015 | Longhurst | H04N 23/84 |
| | | | 358/463 |
| 9,025,084 B2 * | 5/2015 | Nakamura | G06F 3/0482 |
| | | | 345/594 |
| 9,754,384 B2 | 9/2017 | Dong | |
| 10,219,014 B2 | 2/2019 | Van Dusen et al. | |
| 10,497,101 B2 | 12/2019 | Washio | |
| 10,659,784 B2 | 5/2020 | Pomianowski et al. | |
| 10,827,190 B1 | 11/2020 | Blasch et al. | |
| 11,151,749 B2 | 10/2021 | Fitzgerald et al. | |
| 11,657,484 B2 * | 5/2023 | Nishio | H04N 23/71 |
| | | | 382/100 |
| 2007/0183493 A1 | 8/2007 | Kimpe | |
| 2007/0223824 A1 * | 9/2007 | Kato | H04N 25/00 |
| | | | 386/E5.072 |
| 2008/0037880 A1 | 2/2008 | Lai | |
| 2008/0273588 A1 | 11/2008 | Wang | |
| 2009/0103822 A1 | 4/2009 | Guendel et al. | |
| 2009/0274366 A1 | 11/2009 | Iourcha et al. | |
| 2011/0051805 A1 | 3/2011 | Van Splunter et al. | |
| 2013/0155330 A1 * | 6/2013 | Longhurst | H04N 9/73 |
| | | | 348/708 |
| 2014/0132429 A1 | 5/2014 | Scoville | |
| 2016/0353122 A1 | 12/2016 | Krajcevski et al. | |
| 2021/0304377 A1 * | 9/2021 | Nishio | H04N 23/71 |
| 2021/0366435 A1 * | 11/2021 | Abe | G09G 5/10 |
| 2022/0094962 A1 | 3/2022 | Choi et al. | |

FOREIGN PATENT DOCUMENTS

| | | |
|---|---|---|
| EP | 3588954 A1 | 1/2020 |
| EP | 3783892 A1 | 2/2021 |
| EP | 3588951 B1 | 9/2021 |
| JP | 2010183416 A * | 8/2010 |
| WO | 2013056129 A1 | 4/2013 |
| WO | 2017210475 A1 | 12/2017 |
| WO | 2022132306 A1 | 6/2022 |

* cited by examiner $y_i = (x_i - X_1) * (Y_2 - Y_1)/(X_2 - X_1) + Y_1$

TECHNIQUES FOR IMAGE DATA COMPRESSION AUTOMATION

BACKGROUND

In some applications, image data must be transmitted to a remote site over a wireless link or other bandwidth-constrained transmission channel. For example, when a satellite-based image is transmitted to Earth, or a seeker image from a projectile is transmitted to a terrestrial station, the image data must be sent wirelessly. In such a situation, compressing the image data can improve the throughput over the transmission channel. When an estimator of the minimum and maximum values of the image brightness and/or color spectrum is available, bandwidth can be conserved by compressing the image data between those values. In particular, a respective pixel of the image data may be compressed to require fewer bytes of data, thereby increasing the amount of data that can be transmitted for a given transmission bandwidth. Since some parts of the image brightness and/or color spectrum may be more critical than others, the compression ratio may be variable. Improvements to image compression techniques and improving wireless transmission of data have considerable value to industry.

SUMMARY

In an example, a method of compression and/or decompression is provided. The method can comprise obtaining a first set of control points specifying a first set of compression ratios corresponding to respective first regions of a compression domain. The method can further include obtaining a minimum uncompressed value within the compression domain, and obtaining a maximum uncompressed value within the compression domain. The method can further include scaling the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The method can further include adjusting at least one scaled control point such that a slope of a set of slopes among the adjusted scaled set of control points is less than or equal to 1. The method can further include mapping between the compression domain and a range of compressed values. Mapping can comprise compressing from the compression domain into the range of compressed values, or decompressing from the range of compressed values into the compression domain. In some cases, adjusting the at least one scaled control point comprises increasing a location of the at least one scaled control point such that the slope substantially equals 1. In some cases, the method further includes decreasing a location of the at least one scaled control point such that an average slope between the at least one scaled control point and the last scaled control point substantially equals 1. In some cases, the slope is a first slope, and adjusting the at least one scaled control point further comprises adjusting a plurality of scaled control points such that the first slope and a second slope of the set of slopes are less than or equal to 1. In some cases, the adjusted scaled set of control points can specify an adjusted scaled set of compression ratios corresponding to respective adjusted scaled regions of the compression domain. A respective adjusted scaled compression ratio of the adjusted scaled set of compression ratios can be substantially proportional to a respective slope of the set of slopes. Mapping between the compression domain and the range of compressed values can comprise mapping between a respective adjusted scaled region and the range of compressed values according to a respective adjusted scaled compression ratio corresponding to the respective adjusted scaled region. In some cases, a respective control point of the scaled set of control points comprises a respective location corresponding to an uncompressed value within the compression domain, and a respective compressed value within the range of compressed values. In some cases, a respective slope of the set of slopes corresponds to a difference between the respective compressed value and a previous value divided by a difference between the respective location and a previous location. In some cases, the method can further include obtaining an updated minimum uncompressed value and an updated maximum uncompressed value. The method can further include rescaling the scaled set of control points based on the updated minimum uncompressed value and the updated maximum uncompressed value to obtain a rescaled set of control points, wherein a first rescaled control point is located at the updated minimum uncompressed value, and a last rescaled control point is located at the updated maximum uncompressed value. The method can further include readjusting at least one rescaled control point of the rescaled set of control points such that an updated slope of a set of updated slopes among the rescaled set of control points is less than or equal to 1. In some cases, scaling the set of control points comprises linearly scaling the set of control points.

In another example, an imaging system is provided. The imaging system can comprise an imaging device configured to obtain a set of pixel values. The imaging system can further comprise a processing device configured to obtain a first set of control points specifying a first set of compression ratios corresponding to respective first regions of a compression domain for the pixel values. The processing device can be further configured to obtain a minimum uncompressed value within the compression domain. The processing device can be further configured to obtain a maximum uncompressed value within the compression domain. The processing device can be further configured to scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The processing device can be further configured to adjust at least one scaled control point of the scaled set of control points to obtain an adjusted scaled set of control points such that a slope of a set of slopes among the adjusted scaled set of control points is less than or equal to 1. The processing device can be further configured to map between the compression domain for the pixel values and a range of compressed values. To map can comprise to compress from the compression domain into the range of compressed values, or to decompress from the range of compressed values into the compression domain. In some cases, to adjust the at least one scaled control point comprises to increase a location of the at least one scaled control point such that the slope substantially equals 1. In some cases, the processing device is further configured to decrease a location of the at least one scaled control point such that an average slope between the at least one scaled control point and the last scaled control point substantially equals 1. In some cases, the slope is a first slope, and to adjust the at least one scaled control point further comprises to adjust a plurality of scaled control points such that the first slope and a second slope of the set of slopes are less than or equal to 1. In some cases, the adjusted scaled set of control points can specify an adjusted scaled set of compression ratios corresponding to respective adjusted scaled regions of the compression domain. A respective adjusted scaled compression ratio of the adjusted scaled set of compression ratios can be substantially proportional to a respective slope of the set of slopes. To map between the compression domain and the range of compressed values comprises to map between a respective adjusted scaled region and the range of compressed values according to a respective adjusted scaled compression ratio corresponding to the respective adjusted scaled region. In some cases, a respective control point of the scaled set of control points comprises a respective location corresponding to an uncompressed value within the compression domain, and a respective compressed value within the range of compressed values. In some cases, a respective slope of the set of slopes corresponds to a difference between the respective compressed value and a previous value divided by a difference between the respective location and a previous location. In some cases, the processing device can be further configured to obtain an updated minimum uncompressed value and an updated maximum uncompressed value. The processing device can be further configured to rescale the set of control points based on the updated minimum uncompressed value and the updated maximum uncompressed value such that a first rescaled control point is located at the updated minimum uncompressed value, and a last rescaled control point is located at the updated maximum uncompressed value. The processing device can be further configured to readjust at least one rescaled control point of the rescaled set of control points such that an updated slope of a set of updated slopes is less than or equal to 1.

In another example, one or more non-transitory machine-readable mediums storing instructions are provided. When executed by one or more processors, the instructions may cause a compression and/or decompression to be carried out to obtain a first set of control points specifying a first set of compression ratios corresponding to respective first regions of a compression domain. The instructions may further cause the compression and/or decompression process to be carried out to obtain a minimum uncompressed value within the compression domain. The instructions may further cause the compression and/or decompression process to be carried out to obtain a maximum uncompressed value within the compression domain. The instructions may further cause the compression and/or decompression process to be carried out to scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The instructions may further cause the compression and/or decompression process to be carried out to adjust at least one scaled control point of the scaled set of control points to obtain an adjusted scaled set of control points such that a slope of a set of slopes among the adjusted scaled set of control points is less than or equal to 1. The instructions may further cause the compression and/or decompression process to be carried out to map between the compression domain and a range of compressed values. To map can comprise to compress from the compression domain into the range of compressed values, or to decompress from the range of compressed values into the compression domain. To map can be based on a respective compression ratio corresponding to a respective slope of the set of slopes. In some cases, to adjust the at least one scaled control point comprises to increase a location of the at least one scaled control point such that the slope substantially equals 1. In some cases, a respective control point of the scaled set of control points can comprise a respective location corresponding to an uncompressed value within the compression domain, and a respective compressed value within the range of compressed values. A respective slope of the set of slopes can correspond to a difference between the respective compressed value and a previous value divided by a difference between the respective location and a previous location.

DETAILED DESCRIPTION

Figure 1A:
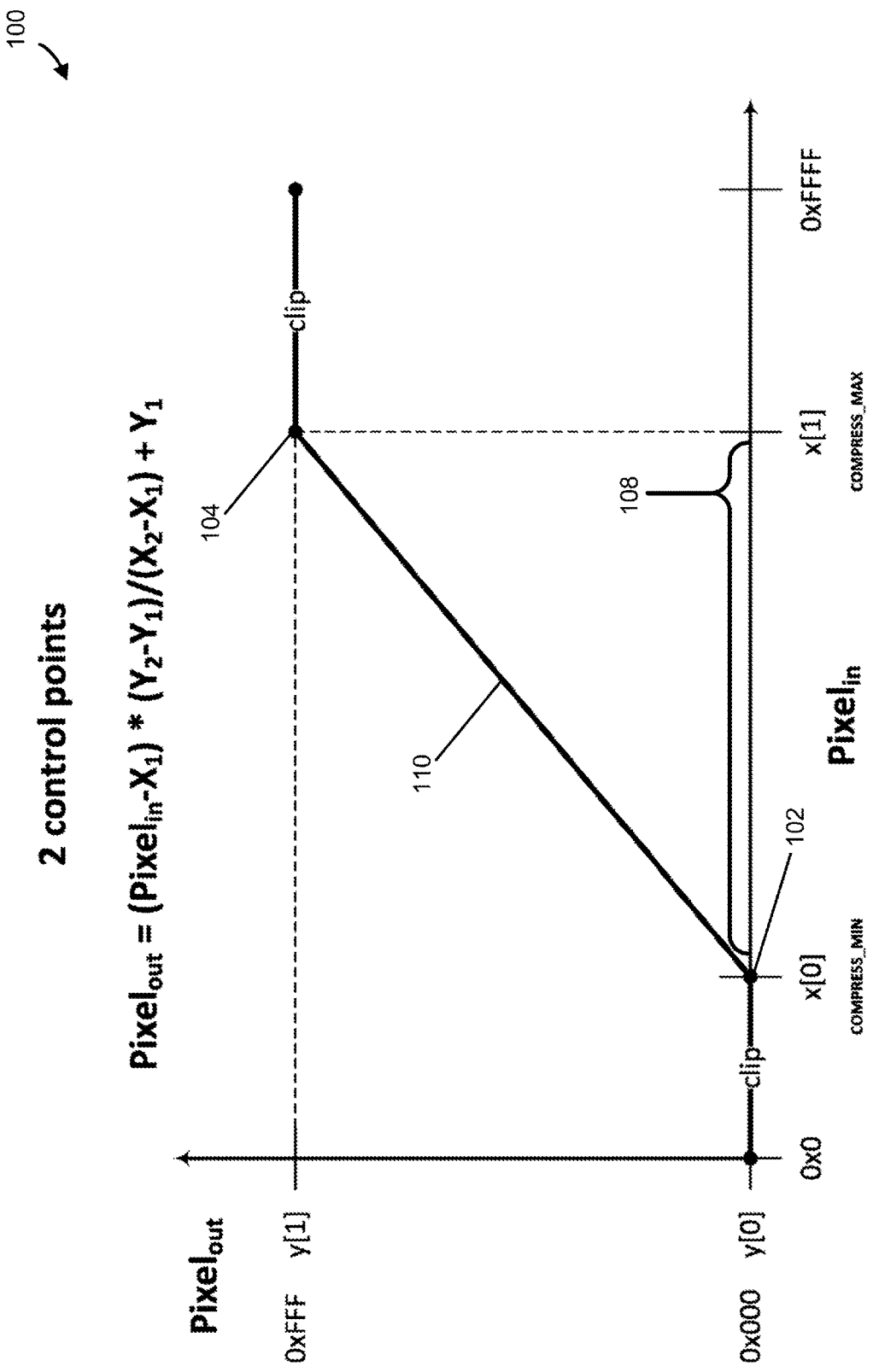
FIG. 1A illustrates a compression and/or decompression graph with two control points.

Techniques are disclosed to provide compression and/or decompression. The disclosed techniques enable a user to set a number, locations, and values of compression control points, thereby optimizing (or otherwise reducing) the amount of local compression loss in each region of a signal, while maintaining an overall compression ratio. Moreover, the disclosed techniques improve the control points by rescaling the control points when the domain of values to be compressed (also referred to herein as the compression domain) evolves, and ensuring that the local compression ratios do not exceed 1, thereby preserving bandwidth.

General Overview

In some applications, image data must be transmitted to a remote site over a wireless link or other bandwidth-constrained transmission channel. For example, when a satellite-based image is transmitted to Earth, or a seeker image from a projectile is transmitted to a terrestrial station, the image data must be sent wirelessly. In such a situation, compressing the image data can improve the throughput over the bandwidth-constrained transmission channel. When an estimator of the minimum and maximum values of the image brightness and/or color spectrum is available, bandwidth can be conserved by compressing the image data between those minimum and maximum values. In particular, a respective pixel of the image data may be compressed to require fewer bytes of data, thereby increasing the amount of data that can be transmitted for a given transmission bandwidth. Since some parts of the image brightness and/or color spectrum may be more critical than others, the compression ratio may be variable. Control points, defined by a user or automatically, can specify a compression ratio for each region of the spectrum.

Thus, and according to some embodiments, techniques are provided herein that can enable a user to set a number, locations, and values of control points, thereby optimizing (or otherwise improving, relative to some compression techniques) the amount of local compression in each region of a signal, while maintaining an overall compression ratio. Moreover, the control points may be improved by rescaling the control points when the domain of values to be compressed (also referred to herein as the compression domain) evolves, and ensuring that the local compression ratios have values less than or equal to 1, thereby preserving bandwidth. For example, estimators of the minimum and maximum pixel values may be referred to as COMPRESS_MIN and COMPRESS_MAX, respectively, as described below in the example of FIG. 2. If COMPRESS_MIN and COMPRESS_MAX evolve over time, the disclosed techniques can rescale the control points based on their relative positions between COMPRESS_MIN and COMPRESS_MAX. In addition, the disclosed techniques can adjust the control points to preserve compression bandwidth by ensuring the compression ratios do not exceed 1, both between successive control points and over longer intervals between each control point and COMPRESS_MAX, as described in the examples of FIGS. 4-5. Accordingly, the disclosed techniques improve compression techniques by rescaling a set of control points when the compression domain evolves, while ensuring that the local compression ratios preserve bandwidth.

FIG. 1A illustrates a compression and/or decompression graph 100 with two control points 102 and 104 (also referred to as compression points). As illustrated, the horizontal axis represents uncompressed data values, which may be referred to as X. For example, a respective uncompressed data value may include a brightness value and/or or color code of an individual pixel, such as in an imaging device. The vertical axis represents the corresponding compressed values of the same data, which may be referred to as Y. The compression and/or decompression graph 100 illustrates the relationship between any given uncompressed value and its corresponding compressed value. In particular, graph 100 may be invertible, indicating that each uncompressed value corresponds to exactly one compressed value. For the nth control point, the uncompressed value may be referred to as $X_n$ or $X[n]$, while the corresponding compressed value may be referred to as $Y_n$ or $Y[n]$.

Note that, in general, the compressed values will be smaller than the uncompressed values, and can be represented with fewer bytes of data. For example, even when COMPRESS_MIN>0, the compression and/or decompression graph 100 may still map $X[0]$=COMPRESS_MIN to $Y[0]$=0. Similarly, regardless of whether COMPRESS_MAX<$2^b$−1 or COMPRESS_MAX≈$2^b$−1, where b is the number of uncompressed bits and $2^b$−1 is the maximum unsigned value representable in b bits, the compression and/or decompression graph 100 may still map $X[N-1]$=COMPRESS_MAX to $Y[N-1]$=$2^c$, where c is the number of compressed bits and c<b. Because the values of COMPRESS_MIN and COMPRESS_MAX can be selected so that the region 108 between them contains the majority of uncompressed image data values, when COMPRESS_MIN>0 or COMPRESS_MAX<$2^b$−1, representing the uncompressed data in region 108 with the full b bits may result in the disuse of some bits, potentially wasting capacity. Accordingly, even when the slope of the region 110 of graph 100 equals 1, the compression can reduce the size of the data values.

Note that region 108, which contains the image data values to be compressed, may be referred to as the compression domain. In some examples, the compression domain can include the entire region between the first control point's location, which may be at COMPRESS_MIN, and the last control point's location, which may be at COMPRESS_MAX. Likewise, the region of compressed values between the first control point's value, y[0], and the last control point's value, y[N-1]=y[1] in this example, may be referred to as the compression range.

When the slope of the region 110 is less than 1, the compression can further reduce the amount of information needed. In particular, the slope or derivative of graph 100 corresponds to a compression ratio of the compression in the region 110. In particular, the number of uncompressed values to be compressed in region 108 is x[1]-x[0], while the number of corresponding compressed values is y[1]-y[0]. Accordingly, the compression ratio of region 110 is equal to the region's slope (y[1]-y[0])/(x[1]-x[0]).

In the example of FIG. 1, there are no intermediate control points between control point 102, located at COMPRESS_MIN, and control point 104, located at COMPRESS_MAX. In this example, the locations of the control points are identical to COMPRESS_MIN and COMPRESS_MAX, because in some embodiments, the locations of the first and last control points 102 and 104 can be chosen to match the two endpoints of the uncompressed region 108.

Because in this example, the graph 100 does not make use of intermediate control points, the entire uncompressed region 108 between COMPRESS_MIN and COMPRESS_MAX is compressed according to a linear interpolation 110 between control points 102 and 104. In particular, the compressed data value (e.g., a brightness value and/or a color code) $Pixel_{out}$ can be determined in terms of the uncompressed data value $Pixel_{in}$ as the linear interpolation 110 between the two control points, according to a formula $Pixel_{out}=(Pixel_{in}-X_1)(Y_2-Y_1)/(X_2-X_1)+Y_1$, as illustrated by the graph 100. Accordingly, there is no variation in the compression ratio, as all uncompressed values in the entire range have the same slope, (y[1]-y[0])/(x[1]-x[0])=$2^c$/(COMPRESS_MAX−COMPRESS_MIN).

Figure 1B:
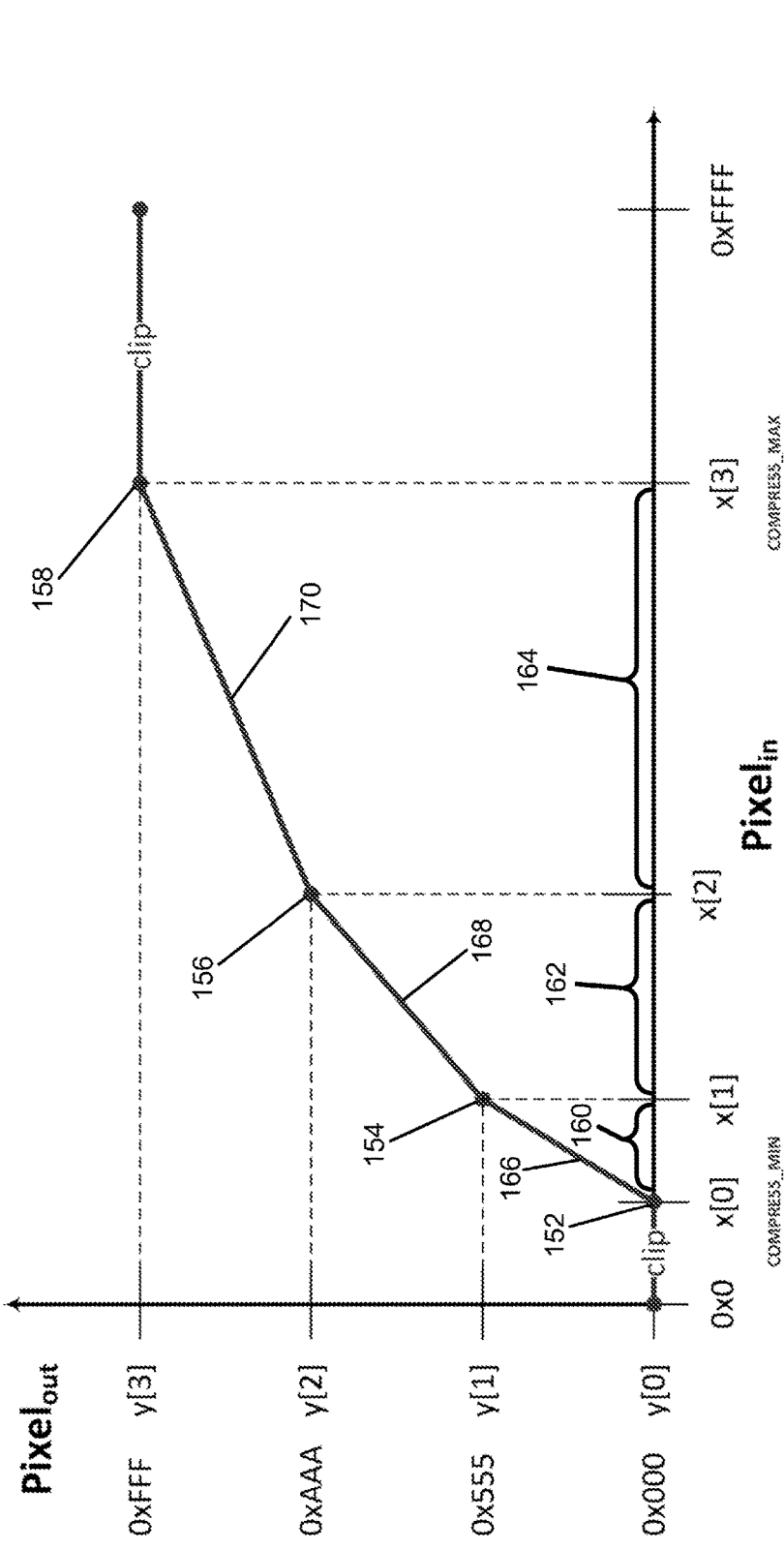
FIG. 1B illustrates a compression and/or decompression graph with four control points.

FIG. 1B illustrates a compression and/or decompression graph 150 with four control points 152, 154, 156, and 158. Accordingly, the compression and/or decompression graph 150 in this example does have intermediate control points, unlike the example of FIG. 1A. By specifying such intermediate control points 154 and 156, a user can optimize the amount of compression loss in different regions of the signal.

As illustrated, the control points 152, 154, 156, and 158 define three uncompressed regions 160, 162, and 164, which can each be compressed with an independent compression ratio. For example, the corresponding line segments, 166, 168, and 170, respectively, have different slopes, as shown. These different slopes can correspond to independent compression ratios of these three regions. In this example, the compression domain includes uncompressed regions 160, 162, and 164 together, i.e. the compression domain includes the entire region between the first control point 152 (which may be located at x[0]=COMPRESS_MIN) and the last control point 158 (which may be located at x[3]=COMPRESS_MAX).

In some examples, the locations and values of the control points 152, 154, 156, and 158, as well as the number of control points, may be specified by a user, thereby setting the local compression ratios used in the various regions 160, 162, and 164 of the full domain of uncompressed values. This may enable the user to optimize the amount of local compression loss in each region of the signal, such as regions 160, 162, and 164, while maintaining the overall compression ratio. For example, a user may select a higher local compression ratio in regions where data accuracy is most important, and a lower compression ratio in regions where bandwidth and compression efficiency are most important.

Note that, in some examples, the system may obtain the number, locations, and/or values of the control points 152, 154, 156, and 158, in another way. For example, the system and/or a control point generator may obtain the number, locations, and/or values of the control points 152, 154, 156, and 158 from a previous imaging frame, as described below in the examples of FIGS. 2-3. The system and/or a control point generator may then rescale the control points as the values of COMPRESS_MIN and COMPRESS_MAX evolve (for example, due to changes in lighting conditions), as disclosed herein. The system and/or a control point generator may then adjust the control points based on a moving average calculation, as described below in the examples of FIGS. 2-3.

In this example, the compressed data values $Pixel_{out}$ can be determined in terms of the uncompressed data values $Pixel_{in}$ as the linear interpolations 166, 168, and 170 between the respective control points, according to a formula $Pixel_{out}=(Pixel_{in}-X_i)(Y_{i+1}-Y_i)/(X_{i+1}-X_i)+Y_i$. Because these respective linear interpolations differ, there is variation in the local compression ratio. In particular, the number of uncompressed values to be compressed in each of regions 160, 162, and 164 is x[1]−x[0], x[2]−x[1], and x[3]−x[2], respectively, while the number of corresponding compressed values is y[1]−y[0], y[2]−y[1], and y[3]−y[2], respectively. Accordingly, the compression ratio of region 166 is equal to the region's slope (y[1]−y[0])/(x[1]−x[0]), while the compression ratio of region 168 is (y[2]−y[1])/(x[2]−x[1]), and the compression ratio of region 170 is (y[3]−y[2])/(x[3]−x[2]). By adjusting the locations X and compressed values Y of the respective control points, a user may optimize these local compression ratios and the overall tradeoff between compression efficiency and data accuracy.

Figure 2:
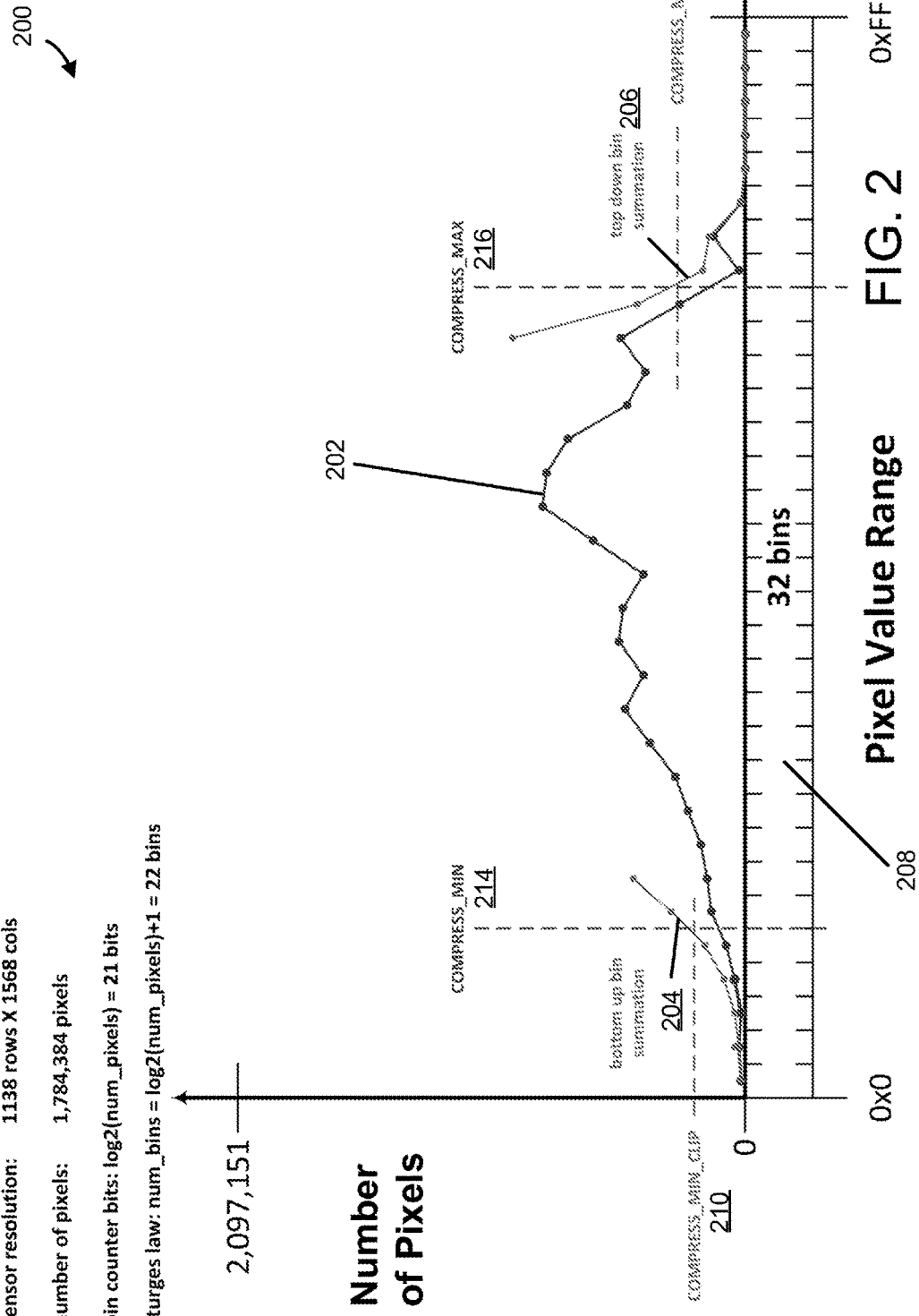
FIG. 2 illustrates how summations of bins are used to calculate COMPRESS_MIN and COMPRESS_MAX for a respective frame of an imaging device.

FIG. 2 illustrates how summations of bins are used to calculate COMPRESS_MIN and COMPRESS_MAX for a respective frame of an imaging device. A device, such as an image sensor, may perform the calculation 200 of COMPRESS_MIN and COMPRESS_MAX in real time as it operates. In this example, the pixel value histogram 202 illustrates a pixel count for each pixel value range, while the cumulative sums 204 and 206 show the cumulative pixel counts based on bottom-up and top-down summation, respectively. In some examples, the system may perform calculation 200 of COMPRESS_MIN and COMPRESS_MAX for each imaging frame.

The histogram 202 can be based on historical data, such as the device's actual pixel counts over the past 10 seconds, 1 minute, 10 minutes, 1 hour, 10 hours, or 1 day. In this example, the pixel values of the histogram 202 may be binned into ranges. The bins should be of uniform size. In this example, 32 bins are used, but the number of bins may vary in various examples. For example, the number of bins $N_b$ may be chosen in accordance with Sturges' law, as $N_b \geq \log_2(N_p)+1$, where $N_p$ is the number of pixels in the imaging sensor's array.

The cumulative pixel count 204 may be a bottom-up summation of the pixel value histogram 202 starting from a pixel value of 0, while the cumulative pixel count 206 may be a top-down summation of the pixel value histogram 202 from the maximum pixel value (0xFFFF=65,536 in this example). In particular, at a respective pixel value Y 208, in this example the system may calculate the bottom-up pixel count 204 as a sum of the histogram 202 from a pixel value of 0 to Y 208. Likewise, the system may calculate the top-down pixel count 206 as a sum of histogram 202 from Y 208 to 0xFFFF.

In an example, the system determines COMPRESS_MIN and COMPRESS_MAX based on the pixel values Y=COMPRESS_MIN and Y=COMPRESS_MAX where the bottom-up pixel count 204 and top-down pixel count 206 reach predetermined threshold values COMPRESS_MIN_CLIP and COMPRESS_MAX_CLIP, respectively.

In an example, a user can set the values of COMPRESS_MIN_CLIP 210 and/or COMPRESS_MAX_CLIP 212. The system, for example a sensor or other device, may calculate COMPRESS_MIN 214 and/or COMPRESS_MAX 216 based on COMPRESS_MIN_CLIP 210 and/or COMPRESS_MAX_CLIP 212 and the histogram 202.

In some examples, the system can determine new bin values and summations, as well as values for COMPRESS_MIN and COMPRESS_MAX, independently for each frame of the imaging device. Alternatively or additionally, the system may recompute COMPRESS_MIN and COMPRESS_MAX on some other interval, such as every N frames (for N=5, 10, 15, etc.) or at regular intervals in time (such as every second, every 2 seconds, every 5 seconds, every 15 seconds, every minute, every 5 minutes, etc.), and is not limited by the present disclosure.

Figure 3:
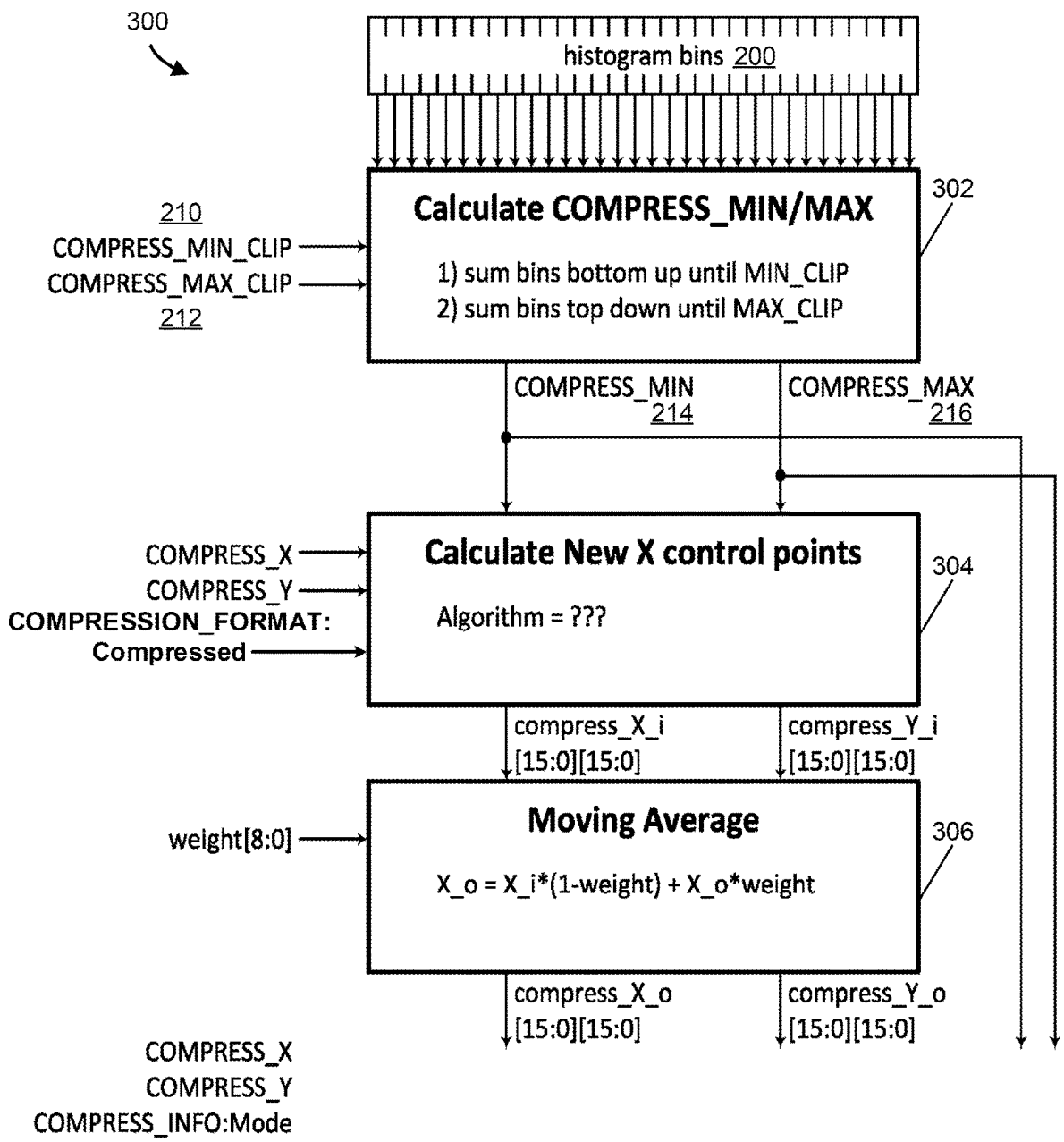
FIG. 3 is a block diagram illustrating a control point generator, in accordance with an example of the present disclosure.

FIG. 3 is a block diagram illustrating a control point generator 300, in accordance with an example of the present disclosure. In this example, the control point generator 300 can include a COMPRESS_MIN and/or COMPRESS_MAX calculator 302, a new control point calculator 304, and a moving average calculator 306.

The COMPRESS_MIN and/or COMPRESS_MAX calculator 302 can receive the histogram bin information 200 and COMPRESS_MIN_CLIP 210 and COMPRESS_MAX_CLIP 212. The calculator 302 can then compute COMPRESS_MIN 214 by bottom-up summation and/or compute COMPRESS_MAX 216 by top-down summation, as described above in the example of FIG. 2.

The control point calculator 304 can dynamically compute adjusted control points as the values of COMPRESS_MIN 214 and/or COMPRESS_MAX 216 change over time, as disclosed herein. For example, the calculator 302 may compute COMPRESS_MIN 214 and COMPRESS_MAX 216 based on summations over the pixel counts or histograms within each imaging frame, as in the example of FIG. 2, so COMPRESS_MIN and COMPRESS_MAX may vary over time. Accordingly, control point calculator 304 may compute adjusted locations of the control points as COMPRESS_MIN and/or COMPRESS_MAX change. For example, control point calculator 304 can apply a dynamic control point adaptation method, such as the methods described in the examples of FIGS. 4 and 5 below.

The moving average calculator 306 may adjust the control points, based on a set of weights. For example, the initially-generated control points $X_i$ can be passed through a moving average calculator 306, which can gradually evolve the output control points $X_o$ towards the inputs $X_i$. The moving average calculator 306 can ensure that the control points evolve sufficiently smoothly between frames, so as to prevent them from being inordinately affected by transient or sudden changes, noise, or the like in the imaging data.

In the example of FIG. 3, $X_i$ may refer to the set of control points most recently generated, e.g. the set of control points most recently generated in the current frame and/or the most recent output of the control point calculator 304. In this example, $X_o$ may refer to the set of control points actually in use. In particular, before the moving average calculation, $X_o$ may initially refer to the control points from the previous frame and/or from a previous moving average calculation. After the moving average calculation, $X_o$ may refer to the updated control points output by moving average calculator 306, which can be used to compress the current image frame data, as in the examples of FIGS. 1A-1B.

Accordingly, depending on the value of the weights, the moving average calculator 306 can mix some proportion of the old value of $X_o$ and the newly-generated $X_i$, to obtain the current frame's $X_o$ value. For example, in each frame, the moving average calculator 306 may apply a formula such as $X_o=(X_i)(1-\text{weight})+(X_o)(\text{weight})$, which can modify $X_o$ towards the values $X_i$ calculated in the current frame by control point calculator 304. In this example, the weight can be selected between 0 and 1, for example by a user input, and can determine how rapidly $X_o$ evolves towards $X_i$. A weight value closer to 1 can provide more gradual evolution of $X_o$ towards $X_i$, whereas a weight value near 0 can provide more rapid evolution.

In some examples, the control point calculator 304 and/or moving average calculator 306 may update the control points and/or moving average computation in each image frame. Alternatively or additionally, the system may update the control points and/or moving averages at regular intervals (such as every 10 seconds, minute, 10 minutes, hour, or day), or the system may update the moving average calculations in response to another event, such as a sudden change in light level, and is not limited by the present disclosure.

Figure 4:
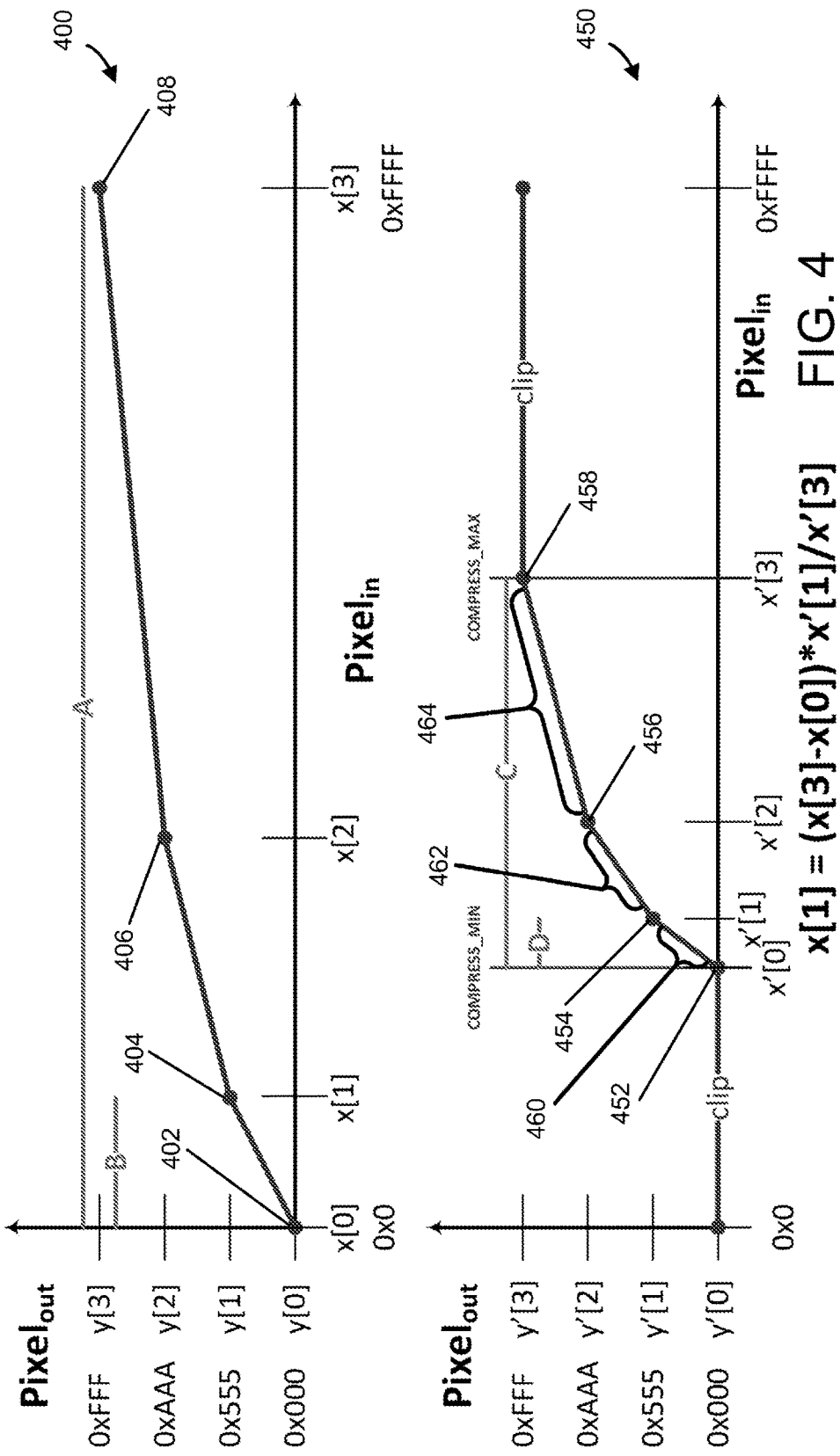
FIG. 4 illustrates linear scaling of control points, in accordance with an example of the present disclosure.

FIG. 4 illustrates linear scaling 450 of control points 400, in accordance with an example of the present disclosure. In this example, the compression graph 400 has four control points 402-408, including two intermediate control points 404 and 406, as in the example of FIG. 1B. The compression graph 450 is a scaled version of the graph 400. Similar to unscaled graph 400, the compression graph 450 has four corresponding control points 452-458, including two intermediate control points 454 and 456.

In scaled compression graph 450, the uncompressed domain is smaller than in graph 400 because the values of COMPRESS_MIN and COMPRESS_MAX have changed. For example, COMPRESS_MIN and COMPRESS_MAX may be computed in each imaging frame, as described above in the example of FIG. 2. Accordingly, COMPRESS_MIN and COMPRESS_MAX may vary over time. When COMPRESS_MIN and/or COMPRESS_MAX change, the disclosed system and methods can scale the compression graph and/or control points, as described in this example. In some examples, changes in the control points may be smoothed over time, such as by moving average calculator 306 of the example of FIG. 3.

Let us assume N is the number of control points, n is a control point index ranging from 0 to N-1, X[n] is the location of the nth control point in the original set of control points in graph 400, Y[n] is the value of the nth control point in the original set of control points in graph 400, X'[n] is the location of the nth scaled control point in the scaled set of control points in graph 450, X'[0]=COMPRESS_MIN, X'[N-1]=COMPRESS_MAX, X[0]=Y[0]=0, X[N-1]=$2^b$, b is the total number of uncompressed bits, Y[N-1]=$2^c$, and c is the total number of compressed bits. The disclosed system and methods can select and/or adjust the locations of the intermediate scaled control points, X'[n] for n ranging from 1 to N-2. In this example, only the locations X' of the scaled control points are adjusted in the scaled graph 450, and the values of the control points are unchanged. In this example, N=4, and the intermediate scaled control points 454 and 456 are located at X'[1] and X'[2].

When COMPRESS_MIN and COMPRESS_MAX change, the system may set the location X'[0] of the first control point to COMPRESS_MIN, and the location X'[N-1] of the last control point to COMPRESS_MAX. For example, as illustrated in scaled compression graph 450, the control point 452 has a location X'[0]=COMPRESS_MIN, and the control point 458 has location X'[N-1]=COMPRESS_MAX. The intermediate scaled control points 454 and 456 can be scaled within the interval from COMPRESS_MIN to COMPRESS_MAX and adjusted to ensure the compression ratio is less than or equal to 1 for any interval of the graph 450, in accordance with examples of the present disclosure.

In particular, a respective intermediate control point can be scaled linearly based on the changed values of COMPRESS_MIN and COMPRESS_MAX. For example, as shown in FIG. 4, the locations X'[1] and X'[2] of the intermediate control points 454 and 456 can be scaled linearly, such that D/C=B/A. Here A and B are distances defined in the original graph 400, in particular A=X[N-1]-X[0]=$2^b$ is the original uncompressed domain of graph 400, where b is the number of uncompressed bits, B=X[n]-X[0] is the original distance from point 402 to point 404 in graph 400. Likewise, C and D are distances defined in scaled graph 450, in particular C=X'[N-1]-X'[0]=COMPRESS_MAX-COMPRESS_MIN is the scaled uncompressed domain of graph 450, and D=CB/A=(X'[N-1]-X'[0]) (X[n]-X[0])/(X[N-1]-X[0])=(COMPRESS_MAX-COMPRESS_MIN) X[n]/$2^b$ is the scaled distance from point 452 to point 454 in graph 450. Accordingly, the system can set control point 454 to a scaled location a distance D from the first scaled point 452.

Note that, in this example, B and D are illustrated such that n=1, but in various examples, n may refer to any intermediate control point to be scaled. Accordingly, the system can iteratively scale each respective control point such that its position relative to the scaled uncompressed domain C=COMPRESS_MAX-COMPRESS_MIN, is the same as the corresponding unscaled control point's relative position in the unscaled domain A. In this example, for each respective intermediate control point 454 and 456 in graph 450, X'[n] can be selected according to X'[n]=X'[n-1]+D, where D=CB/A for the appropriate value of B, as described above.

In some examples, the disclosed system and methods can then adjust the intermediate scaled control points to ensure the compression ratio does not exceed 1 for any interval. A compression ratio exceeding 1 may squander compression bandwidth, since the compressed region may occupy more bits of data than the corresponding uncompressed region. Accordingly, the system may first determine whether a respective slope between a respective scaled intermediate control point $X'[n]$ and the previous control point $X'[n-1]$ exceeds 1. In particular, if $X'[n]-X'[n-1]<Y[n]-Y[n-1]$, the respective slope $S[n-1, n]=(Y[n]-Y[n-1])/(X'[n]-X'[n-1])$ exceeds 1. For example, in scaled graph 450, the system may iteratively determine whether the slopes $S[0, 1]$ of region 460 between intermediate control points 452 and 454, $S[1, 2]$ of region 462 between intermediate control points 454 and 456, or $S[2, 3]$ of region 464 between intermediate control points 456 and 458 exceed 1.

If a respective slope $S[n-1, n]$ exceeds 1, the system can increase the location $X'[n]$ of the respective scaled control point, so that $S[n-1, n]$ is at most 1. For example, $X'[n]$ can be adjusted according to: $X'[n]=X'[n-1]+(Y[n]-Y[n-1])$. Such an adjustment would result in a slope of $S[n-1, n]=(Y[n]-Y[n-1])/(X'[n]-X'[n-1])=1$. In some examples, $X'[n]$ can be adjusted according to: $X'[n]>X'[n-1]+(Y[n]-Y[n-1])$, resulting in a slope $S[n-1, n]\leq 1$. In some embodiments, the system may adjust the respective slope $S[n-1, n]$ in a different way, for example by decreasing the location $X'[n-1]$ of the preceding scaled control point, and is not limited by the present disclosure. For example, the system may adjust $X'[n-1]$ according to: $X'[n-1]=X'[n]-(Y[n]-Y[n-1])$. In yet another example, the system can adjust $Y[n]$ and/or $Y[n-1]$ in order to decrease the slope $S[n-1, n]$, and is not limited by the present disclosure.

In some examples, the system can also determine whether the average slope from the respective scaled control point to the last scaled control point exceeds 1. In particular, if $X'[N-1]-X'[n]=COMPRESS\_MAX-X'[n]<Y[N-1]-Y[n]=2^c-Y[n]$, the average slope $S[n, N-1]=(Y[N-1]-Y[n])/(X'[N-1]-X'[n])=(2^c-Y[n])/(COMPRESS\_MAX-X'[n])$ exceeds 1. An average slope exceeding 1 may waste compression bandwidth, because the compressed region is larger than the corresponding uncompressed region from the respective control point to COMPRESS_MAX.

If the average slope $S[n, N-1]$ exceeds 1, the system can decrease the location of the respective scaled control point. For example, $X'[n]$ can be adjusted according to: $X'[n]=X'[N-1]-(Y[N-1]-Y[n])$. Such an adjustment would result in an average slope of $S[n, N-1]=(Y[N-1]-Y[n])/(X'[N-1]-X'[n])=1$. In some examples, $X'[n]$ can be adjusted according to: $X'[n]>X'[N-1]+(Y[n]-Y[N-1])$, resulting in a slope $S[n, N-1]\leq 1$. In some embodiments, the system may adjust the respective slope $S[n, N-1]$ in a different way, for example by adjusting $Y[n]$ in order to decrease the slope $S[n, N-1]$, and is not limited by the present disclosure.

In some examples, the system can also determine whether the location of the respective scaled control point is less than COMPRESS_MIN. In particular, if $X'[n]<COMPRESS\_MIN$, the respective location is below its minimum permitted value. Accordingly, if the location of the respective scaled control point is less than COMPRESS_MIN, the system may increase the location of the respective scaled control point to COMPRESS_MIN. For example, $X'[n]$ can be adjusted according to: $X'[n]=COMPRESS\_MIN$.

In some embodiments, the system can iterate these steps for each intermediate control point. In particular, the disclosed system may iterate through all intermediate control points, scaling them linearly based on COMPRESS_MIN and COMPRESS_MAX, and adjusting them to preserve compression bandwidth, both between successive control points and over a longer interval to COMPRESS_MAX. Of course, if a particular control point does not require adjustment, the system may omit that control point from adjustment. Adjusting the intermediate scaled control points is described in greater detail in the example of FIG. 5.

Methodology

Figure 5:
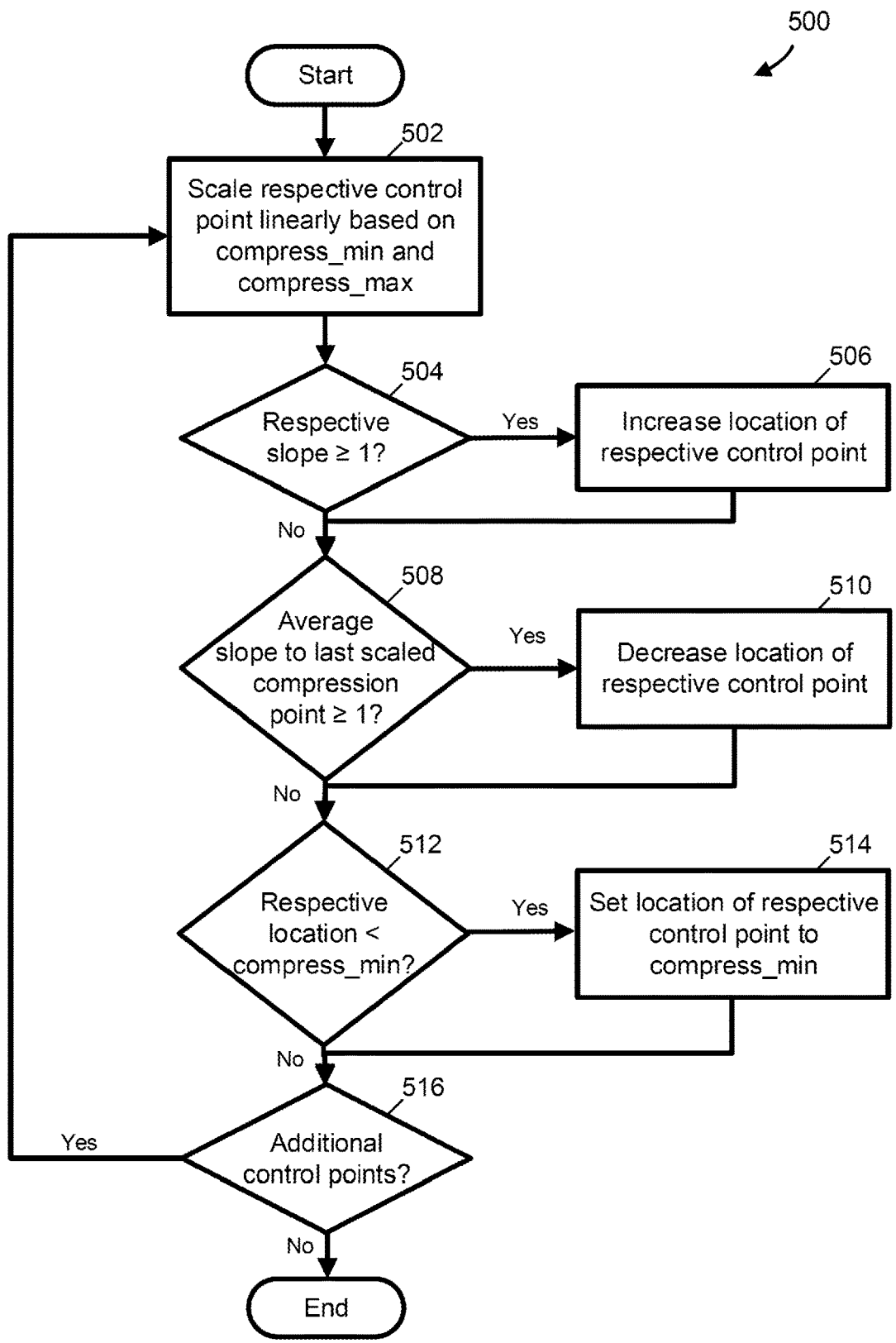
FIG. 5 is a flow diagram illustrating a method of compression and/or decompression, in accordance with an example of the present disclosure.

FIG. 5 is a flow diagram illustrating a method 500 of compression and/or decompression, in accordance with an example of the present disclosure. In various examples, method 500 may be performed by an imaging device, and/or by a processor or processing device.

As in the example of FIG. 4, let us assume N is the number of control points, n is a control point index ranging from 0 to N-1, $X[n]$ is the location of the nth control point in the original set of control points (also referred to as compression points), $Y[n]$ is the value of the nth control point in the original set of control points, $X'[n]$ is the location of the nth scaled control point in the scaled set of control points, $X'[0]=COMPRESS\_MIN$, $X'[N-1]=COMPRESS\_MAX$, $X[0]=Y[0]=0$, $X[N-1]=2^b$, b is the total number of uncompressed bits, $Y[N-1]=2^c$, and c is the total number of compressed bits. The method 500 can select and/or adjust the values of the intermediate scaled control points, $X'[n]$ for n ranging from 1 to N-2. Note that in some examples, the goal of the method 500 is to scale and/or adjust the respective control point locations $X'[n]$, while the respective control point values $Y[n]$ may remain unchanged from the original values.

As shown in FIG. 5, compression and/or decompression starts with scaling 502 a respective control point linearly based on COMPRESS_MIN and COMPRESS_MAX. For example, the point $X'[n]$, for n ranging from 1 to N-2, can be scaled linearly, such that $D/C=B/A$. Here $A=X[N-1]-X[0]=2^b$, where b is the total number of uncompressed bits, $B=X[n]-X[0]=X[n]$, $C=X'[N-1]-X'[0]=COMPRESS\_MAX-COMPRESS\_MIN$, and $D=CB/A=(X'[N-1]-X'[0])(X[n]-X[0])/(X[N-1]-X[0])=(COMPRESS\_MAX-COMPRESS\_MIN) X[n]/2^b$. Accordingly, $X'[n]$ can be selected according to $X'[n]=X'[n-1]+D$.

In some examples, the location and value of the respective control point prior to scaling 502 may be specified by a user, thereby enabling the user to set the local compression ratio used for compression and/or decompression. This may also enable the user to optimize the amount of local compression loss while maintaining an overall compression ratio. For example, a user may select a higher local compression ratio in regions where data accuracy is most important, and a lower compression ratio in regions where bandwidth and compression efficiency are most important. Note that, in some examples, the system may obtain the location and value of the respective control point prior to scaling 502 in another way. For example, the system and/or a control point generator may obtain the control points from a previous imaging frame, as described above in the examples of FIGS. 2-3. The system and/or a control point generator may then rescale the control points as the values of COMPRESS_MIN and COMPRESS_MAX evolve (for example, due to changes in lighting conditions) via the method 500, as described in this example.

Scaling 502 the respective control point linearly is described in greater detail above in the example of FIG. 4.

Next, the method of compression and/or decompression continues with determining 504 whether a respective slope between the respective control point $X'[n]$ and the previous control point $X'[n-1]$ exceeds 1. In particular, if $X'[n]-X'[n-1]<Y[n]-Y[n-1]$, the respective slope $S[n-1, n]=(Y[n]-Y[n-1])/(X'[n]-X'[n-1])$ exceeds 1. A slope exceeding 1 may squander compression bandwidth, because the compressed region $Y[n]-Y[n-1]$ is larger than the corresponding uncompressed region $X'[n]-X'[n-1]$ between the previous control point and the respective control point.

Responsive to the respective slope not exceeding 1, compression bandwidth is not wasted over this interval, and the method of compression and/or decompression can continue with operation 508.

Responsive to the respective slope exceeding 1, the method of compression and/or decompression can continue with increasing 506 the location of the respective scaled control point such that the respective slope is at most 1. Accordingly, X'[n] can be adjusted according to: X'[n]=X'[n−1]+(Y[n]−Y[n−1]).

Next, the method of compression and/or decompression continues with determining 508 whether the average slope to the last scaled compression point exceeds 1. In particular, if X'[N−1]−X'[n]=COMPRESS_MAX−X'[n]<Y[N−1]−Y[n]=$2^c$−Y[n], the average slope S[n, N−1]=(Y[N−1]−Y[n])/(X'[N−1]−X'[n])=($2^c$−Y[n])/(COMPRESS_MAX−X'[n]) exceeds 1. An average slope exceeding 1 wastes compression bandwidth, because the compressed region Y[N−1]−Y[n] is larger than the corresponding uncompressed region COMPRESS_MAX−X'[n] from the respective control point to COMPRESS_MAX.

Responsive to the average slope not exceeding 1, compression bandwidth is not wasted, and the method of compression and/or decompression can continue with operation 512.

Responsive to the average slope exceeding 1, the method of compression and/or decompression can continue with decreasing 510 the location of the respective scaled control point. Accordingly, X'[n] can be adjusted according to: X'[n]=X'[N−1]−(Y[N−1]−Y[n]).

Next, the method of compression and/or decompression continues with determining 512 whether the location of the respective scaled control point is less than COMPRESS_MIN. In particular, if X'[n]<COMPRESS_MIN, the respective location is below its minimum value.

Responsive to the respective location not being less than COMPRESS_MIN, the method of compression and/or decompression can continue with operation 516.

Responsive to the respective location being less than COMPRESS_MIN, the method of compression and/or decompression can continue with increasing 514 the location of the respective scaled control point to COMPRESS_MIN. Accordingly, X'[n] can be adjusted according to: X'[n]=COMPRESS_MIN.

Next, the method of compression and/or decompression continues with determining 516 whether additional control points remain. Responsive to additional control points remaining, the method of compression and/or decompression can return to perform operation 502 on a next control point.

Responsive to no additional control points remaining, the method 500 can then end. Accordingly, the method 500 can iterate through all the intermediate control points, scaling them linearly based on COMPRESS_MIN and COMPRESS_MAX, and adjusting them to conserve compression bandwidth, both between successive control points and over a longer interval to COMPRESS_MAX. Subsequent to rescaling the control points in a given imaging frame via the method 500 in response to evolving values of COMPRESS_MIN and COMPRESS_MAX (for example, due to changes in lighting conditions), in some examples, the system and/or a control point generator may then adjust the control points based on a moving average calculation, as described above in the example of FIG. 3.

Figure 6:
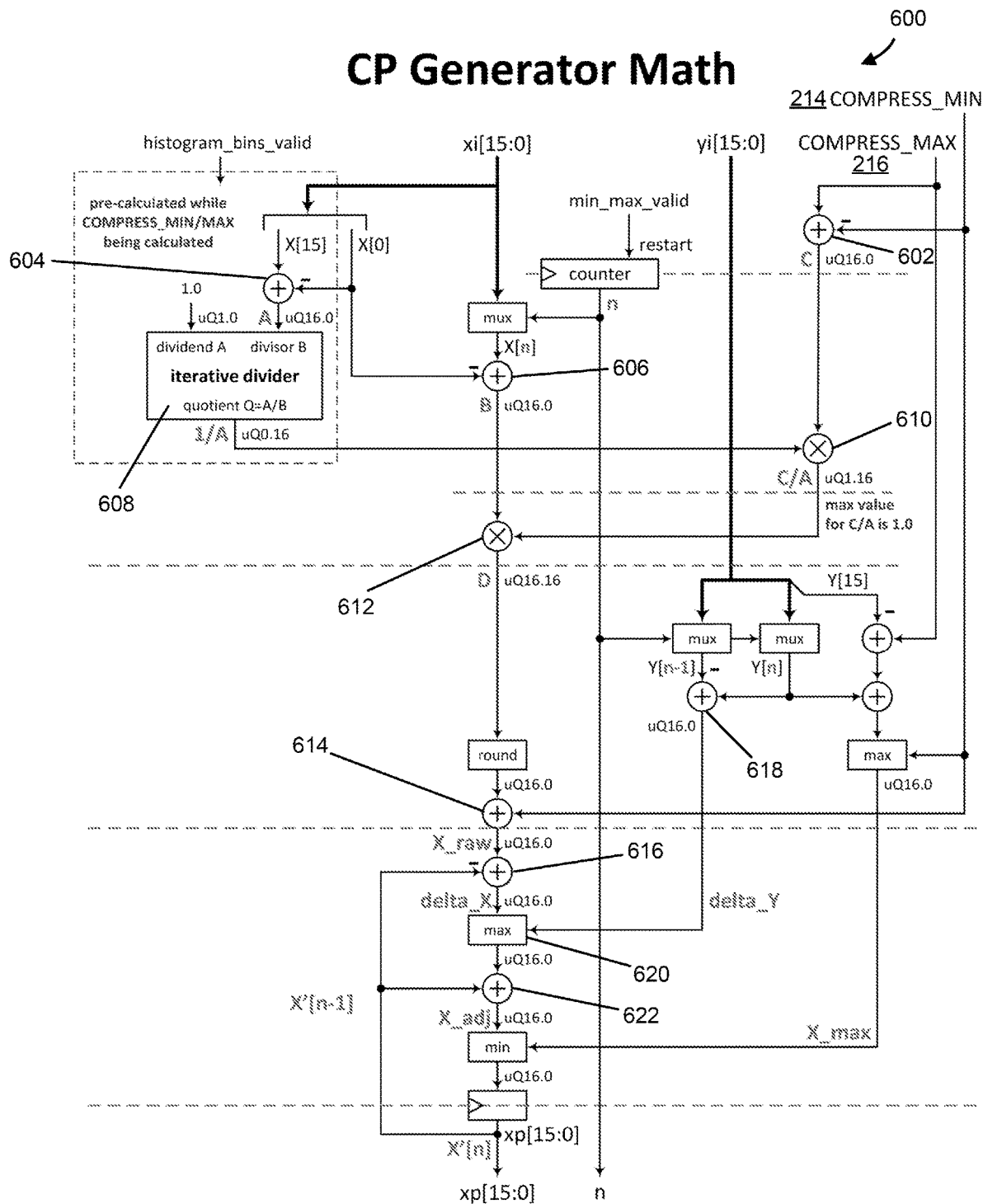
FIG. 6 is a block diagram illustrating control point math, in accordance with an example of the present disclosure.

FIG. 6 is a block diagram illustrating control point math 600, in accordance with an example of the present disclosure. In this example, the circuit 600 can implement a control point generator, such as the control point generator 300 of FIG. 3.

The circuit 600 may receive the values of COMPRESS_MIN 214 and COMPRESS_MAX 216 as inputs, as in FIG. 3, for example from the control point generator. The subtractor 602, or adder-subtractor, may subtract COMPRESS_MIN 214 from COMPRESS_MAX 216 to obtain the value C, which can be equivalent to the difference between the last scaled control point's location X'[N−1] and the first scaled control point's location X'[0], or the uncompressed domain of the scaled graph, as described in the example of FIG. 4. The subtractor 604, or adder-subtractor, can subtract the first unscaled control point's location X[0] from the last unscaled control point's location X[N−1], to obtain the value A, which can be the original uncompressed domain of the unscaled graph, as in the example of FIG. 4.

The subtractor 606, or adder-subtractor, can subtract the first unscaled control point's location X[0] from a respective unscaled control point's location X[n], to obtain the value B, which can be the original distance from the first unscaled control point to a respective unscaled control point in the unscaled graph, as in the example of FIG. 4.

Next, the divider 608 can divide 1.0 by A to obtain 1/A. The multiplier 610 can multiply 1/A by C to obtain C/A. Finally, the multiplier 612 can multiply C/A by B to obtain D=CB/A, which the system may set as the scaled distance from the first scaled control point to a respective scaled control point in the scaled graph, as in the example of FIG. 4. In particular, the adder 614 can add D to COMPRESS_MIN 214 to obtain the scaled location X'[n] of the respective scaled control point.

Subsequently, the subtractor 616, or adder-subtractor, can subtract the previous scaled control point's location X'[n−1] from the respective scaled control point's location X'[n], to obtain ΔX'=X'[n]−X'[n−1], as in the example of FIG. 4. The subtractor 618, or adder-subtractor, can subtract the previous scaled control point's value Y[n−1] from the respective scaled control point's value Y[n], to obtain ΔY=Y[n]−Y[n−1]. The comparator 620 can compare ΔX' to ΔY and the adder 622 can add the larger of these to X'[n−1] to obtain the adjusted scaled location $X_{adj}$'[n] of the respective control point, which results in the respective slope S[n−1, n]≤1, as in the examples of FIGS. 4-5. The circuit 600 may then make additional adjustments to preserve compression bandwidth over a longer interval from the respective scaled control point's location X'[n] to COMPRESS_MAX, and to ensure the respective scaled control point's location X'[n]>COMPRESS_MIN, as described in the examples of FIGS. 4-5.

Figure 7:
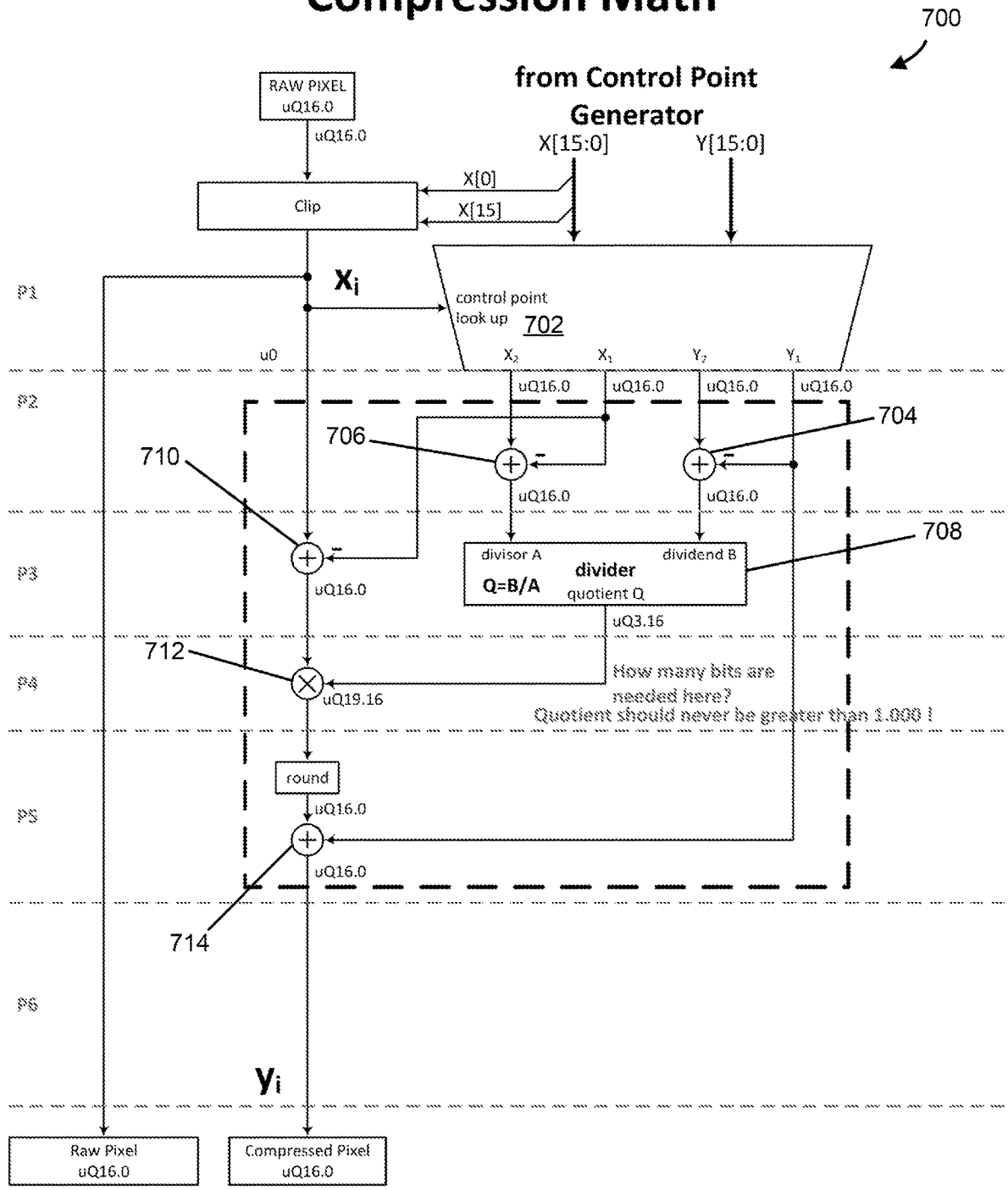
FIG. 7 is a block diagram illustrating compression math, in accordance with an example of the present disclosure.

FIG. 7 is a block diagram illustrating compression math 700, in accordance with an example of the present disclosure. The circuit 600 can compute a respective compressed pixel value $y_i$ from a respective uncompressed pixel value $x_i$, based on a formula $y_i=(x_i-X_{n-1})(Y_n-Y_{n-1})/(X_n-X_{n-1})+Y_{n-1}$. Here $X_{n-1}$ and $X_n$ are locations of a pair of control points between which $x_i$ is located, and $Y_{n-1}$ and $Y_n$ are the values of those control points, respectively.

The circuit 600 can receive the control point locations and values from a control point generator, such as control point generator 304 of the example of FIG. 3 or control point generator 600 of the example of FIG. 6, and can receive the respective uncompressed pixel value $x_i$. A control point lookup module 702 can then determine a pair of control points between which $x_i$ is located, with locations $X_{n-1}$ and $X_n$ and values $Y_{n-1}$ and $Y_n$, respectively. The subtractor 704, or adder-subtractor, can subtract $X_{n-1}$ from $X_n$, to obtain $\Delta X = X_n - X_{n-1}$. The subtractor 706, or adder-subtractor, can subtract $Y_{n-1}$ from $Y_n$, to obtain $\Delta Y = Y_n - Y_{n-1}$. The divider 708 can then divide $\Delta Y$ by $\Delta X$ to obtain the slope $S[n-1, n] = (Y_n - Y_{n-1})/(X_n - X_{n-1}) = \Delta Y/\Delta X$.

The subtractor 710, or adder-subtractor, can subtract $X_{n-1}$ from $x_i$, to obtain $(x_i - X_{n-1})$. The multiplier 712 can then multiply $(x_i - X_{n-1})$ by $S[n-1, n]$ to obtain $(x_i - X_{n-1})(Y_n - Y_{n-1})/(X_n - X_{n-1})$. The adder 714 can then add $Y_{n-1}$ to $(x_i - X_{n-1})(Y_n - Y_{n-1})/(X_n - X_{n-1})$, to obtain $y_i = (x_i - X_{n-1})(Y_n - Y_{n-1})/(X_n - X_{n-1}) + Y_{n-1}$, which is the compressed value $y_i$.

Computing Device

Figure 8:
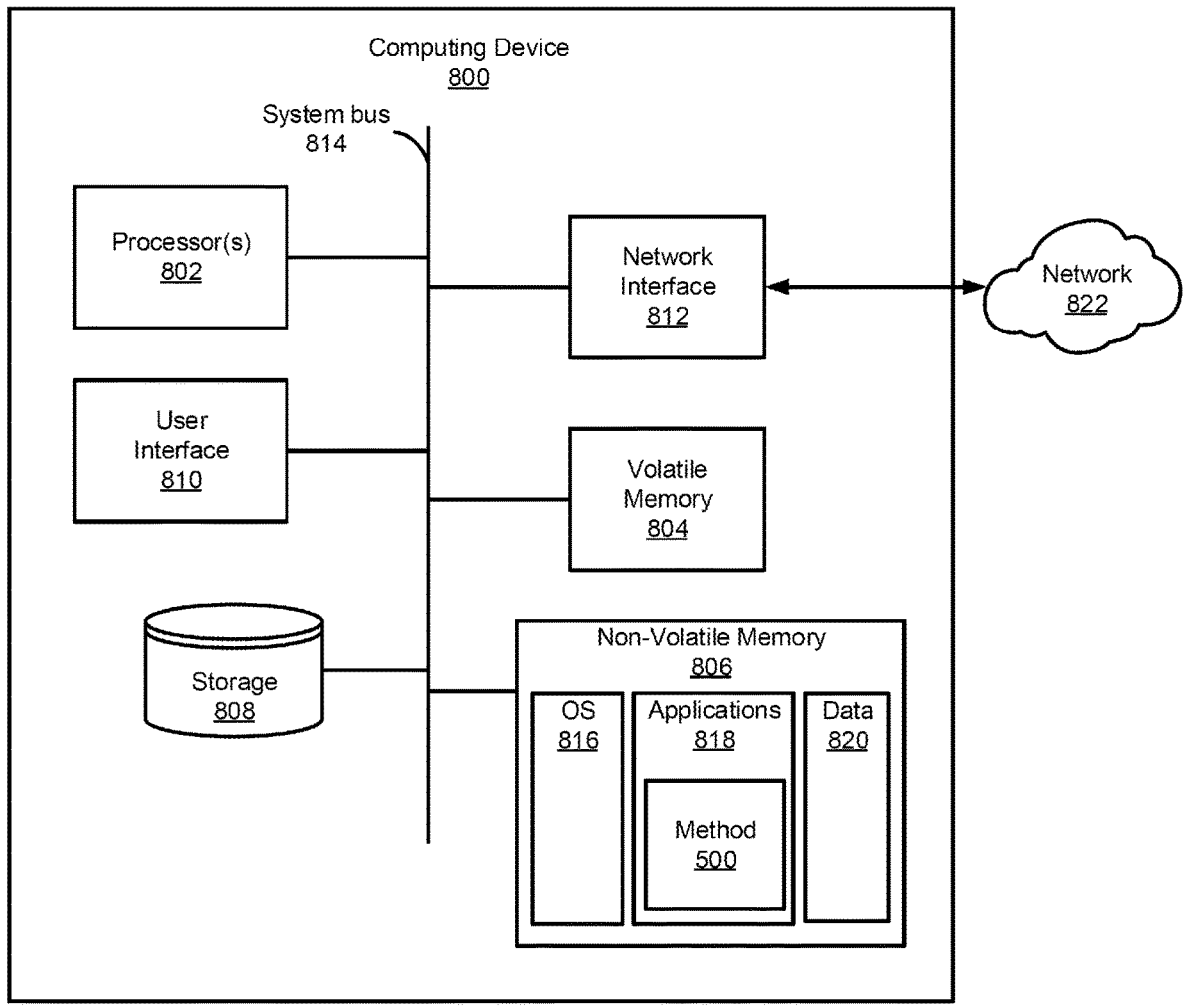
FIG. 8 is a block diagram of a computing device configured to implement various systems and processes in accordance with an example of the present disclosure.

FIG. 8 is a block diagram of a computing device 800 configured to implement various systems and processes in accordance with examples disclosed herein. The computing device 800 may also be referred to as a computer, a client device, an endpoint, a server, or a server computer system. In some embodiments, the computing device 800, or portions thereof, may be hosted on, or otherwise be incorporated into the electronic systems of an airborne platform, a space-based platform, or a ground-based platform including data communications systems, radar systems, computing systems, or embedded systems of any sort. The disclosed techniques may also be used in other platforms including data communication devices, personal computers, workstations, laptop computers, tablets, touchpads, portable computers, handheld computers, cellular telephones, smartphones, or messaging devices. Any combination of different devices may be used in certain embodiments.

In this example, the computing device 800 includes at least one processor 802, a volatile memory 804 such as random access memory (RAM) and/or a cache memory, a non-volatile (non-transitory) memory 806 and/or storage 808, a user interface (UI) 810, one or more network or communication interfaces 812, and a system bus 814 enabling the components of computing device 800 to communicate.

Volatile memory 804 can be implemented using any suitable type of digital storage including, for example, flash memory and/or random access memory (RAM). In some embodiments, the volatile memory 804 may include various layers of memory hierarchy and/or memory caches. Volatile memory 804 may be implemented as a volatile memory device such as, but not limited to, a RAM, dynamic RAM (DRAM), or static RAM (SRAM) device.

The storage 808 and/or non-volatile memory 806 may be implemented as a non-volatile storage device such as, but not limited to, one or more of a hard disk drive (HDD), a solid-state drive (SSD), a universal serial bus (USB) drive, read-only memory (ROM), programmable ROM, flash drives, an optical disk drive, tape drive, an internal storage device, an attached storage device, flash memory, battery backed-up synchronous DRAM (SDRAM), and/or a network accessible storage device. The storage 808 and/or non-volatile memory 806 may also include a combination of physical and virtual storage volumes.

An I/O system may be configured to interface between various I/O devices and other components of computing device 800. I/O devices may include, but not be limited to, user interface 810 and a display element. User interface 810 may include other devices (not shown) such as a touchpad, keyboard, mouse, microphone and speaker, trackball, and scratch pad. The I/O system may include a graphics subsystem configured to perform processing of images for rendering on a display element. For example, the graphics subsystem may be a graphics processing unit or a visual processing unit (VPU). An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor(s) 802 or any chipset of computing device 800. In some examples, the user interface 810 and/or the I/O system can include an interface to the disclosed control point generator 300. For example, the computing device 800 can calculate COMPRESS_MIN and/or COMPRESS_MAX, scale and/or adjust the control points, and/or compress the pixel data, as disclosed herein. Alternatively and/or additionally, in some examples the user interface 810 and/or the I/O devices can include the imaging sensor or other device generating the pixel data.

The non-volatile memory 806 and/or the storage 808 can store an Operating System (OS) 816, one or more applications or programs 818, and data 820. Processor(s) 802 may be configured to execute OS 816, which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). In some examples, the applications or programs 818 can include one or more applications or programs to implement the method(s) 500, as described in FIG. 5 above. As will be appreciated in light of this disclosure, the techniques provided herein can be implemented without regard to the particular operating system provided in conjunction with computing device 800, and therefore may also be implemented using any suitable existing or subsequently-developed systems or platforms.

The processor(s) 802 can be any suitable processor(s), and may include one or more coprocessors or controllers, such as an audio processor, a graphics processing unit, or hardware accelerator, to assist in control and processing operations associated with computing device 800. In some embodiments, the processor(s) 802 may be implemented as any number of processor cores. The processor (or processor cores) may be any type of processor(s), such as, for example, a micro-processor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core. Processor(s) 802 may be implemented as a complex instruction set computer (CISC) or a reduced instruction set computer (RISC) processor.

The network interfaces 812 can enable computing device 800 to access a computer network 822, such as a Local Area Network (LAN), a Wide Area Network (WAN), a Personal Area Network (PAN), or the Internet through a variety of wired and/or wireless connections, including cellular connections and Bluetooth connections. In some examples, the network 822 may allow for communication with other computing devices, to enable distributed computing. The network 822 can include, for example, one or more private and/or public networks over which computing devices can exchange data.

It will be appreciated that in some embodiments, some of the various components of computing device 800 may be combined or integrated in a system-on-a-chip (SoC) architecture. In some embodiments, the components may be hardware components, firmware components, software components or any suitable combination of hardware, firmware or software.

Various embodiments of computing device 800 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductors), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments, computing device 800 may comprise additional, fewer, or alternative subcomponents as compared to those included in the example embodiment of FIG. 8.

The aforementioned non-transitory computer readable medium may include any suitable medium for storing digital information, such as a hard drive, a server, a flash memory, and/or random access memory (RAM), or a combination of memories. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, flash drives, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the example embodiments. It will be appreciated, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Additional Examples

Example 1 is a method of compression and/or decompression. The method can comprise obtaining a first set of control points specifying a first set of compression ratios corresponding to respective first regions of a compression domain. The method can further include obtaining a minimum uncompressed value within the compression domain. The method can further include obtaining a maximum uncompressed value within the compression domain. The method can further include scaling the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The method can further include adjusting at least one scaled control point such that a slope of a set of slopes among the adjusted scaled set of control points is less than or equal to 1. The method can further include mapping between the compression domain and a range of compressed values. Mapping can comprise compressing from the compression domain into the range of compressed values, or decompressing from the range of compressed values into the compression domain.

Example 2 includes the method of Example 1, wherein adjusting the at least one scaled control point comprises increasing a location of the at least one scaled control point such that the slope substantially equals 1.

Example 3 includes the method of any one of the previous Examples, wherein the method further includes decreasing a location of the at least one scaled control point such that an average slope between the at least one scaled control point and the last scaled control point substantially equals 1.

Example 4 includes the method of any one of the previous Examples, wherein the slope is a first slope, and adjusting the at least one scaled control point further comprises adjusting a plurality of scaled control points such that the first slope is less than or equal to 1, and a second slope of the set of slopes is less than or equal to 1.

Example 5 includes the method of any one of the previous Examples, wherein the adjusted scaled set of control points can specify an adjusted scaled set of compression ratios corresponding to respective adjusted scaled regions of the compression domain. A respective adjusted scaled compression ratio of the adjusted scaled set of compression ratios can be substantially proportional to a respective slope of the set of slopes. Mapping between the compression domain and the range of compressed values can comprise mapping between a respective adjusted scaled region and the range of compressed values according to a respective adjusted scaled compression ratio corresponding to the respective adjusted scaled region.

Example 6 includes the method of any one of the previous Examples, wherein a respective control point of the scaled set of control points comprises a respective location corresponding to an uncompressed value within the compression domain, and a respective compressed value within the range of compressed values.

Example 7 includes the method of Example 6, wherein a respective slope of the set of slopes corresponds to a difference between the respective compressed value and a previous value divided by a difference between the respective location and a previous location.

Example 8 includes the method of any one of the previous Examples, wherein the method can further include obtaining an updated minimum uncompressed value and an updated maximum uncompressed value. The method can further include rescaling the scaled set of control points based on the updated minimum uncompressed value and the updated maximum uncompressed value to obtain a rescaled set of control points, wherein a first rescaled control point is located at the updated minimum uncompressed value, and a last rescaled control point is located at the updated maximum uncompressed value. The method can further include readjusting at least one rescaled control point of the rescaled set of control points such that an updated slope of a set of updated slopes among the rescaled set of control points is less than or equal to 1.

Example 9 includes the method of any one of the previous Examples, wherein scaling the set of control points comprises linearly scaling the set of control points.

Example 10 is an imaging system. The imaging system can comprise an imaging device configured to obtain a set of pixel values. The imaging system can further comprise a processing device configured to obtain a first set of control points specifying a first set of compression ratios corresponding to respective first regions of a compression domain for the pixel values. The processing device can be further configured to obtain a minimum uncompressed value within the compression domain. The processing device can be further configured to obtain a maximum uncompressed value within the compression domain. The processing device can be further configured to scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The processing device can be further configured to adjust at least one scaled control point of the scaled set of control points to obtain an adjusted scaled set of control points such that a slope of a set of slopes among the adjusted scaled set of control points is less than or equal to 1. The processing device can be further configured to map between the compression domain for the pixel values and a range of compressed values. To map can comprise to compress from the compression domain into the range of compressed values, or to decompress from the range of compressed values into the compression domain.

Example 11 includes the system of Examples 10, wherein to adjust the at least one scaled control point comprises to increase a location of the at least one scaled control point such that the slope substantially equals 1.

Example 12 includes the system of any one of Examples 10 through 11, wherein the processing device is further configured to decrease a location of the at least one scaled control point such that an average slope between the at least one scaled control point and the last scaled control point substantially equals 1.

Example 13 includes the system of any one of Examples 10 through 12, wherein the slope is a first slope, and to adjust the at least one scaled control point further comprises to adjust a plurality of scaled control points such that the first slope is less than or equal to 1, and a second slope of the set of slopes is less than or equal to 1.

Example 14 includes the system of any one of Examples 10 through 13, wherein the adjusted scaled set of control points can specify an adjusted scaled set of compression ratios corresponding to respective adjusted scaled regions of the compression domain. A respective adjusted scaled compression ratio of the adjusted scaled set of compression ratios can be substantially proportional to a respective slope of the set of slopes. To map between the compression domain and the range of compressed values comprises to map between a respective adjusted scaled region and the range of compressed values according to a respective adjusted scaled compression ratio corresponding to the respective adjusted scaled region.

Example 15 includes the system of any one of Examples 10 through 14, wherein a respective control point of the scaled set of control points comprises a respective location corresponding to an uncompressed value within the compression domain, and a respective compressed value within the range of compressed values.

Example 16 includes the system of Example 15, wherein a respective slope of the set of slopes corresponds to a difference between the respective compressed value and a previous value divided by a difference between the respective location and a previous location.

Example 17 includes the system of any one of Examples 10 through 16, wherein the processing device can be further configured to obtain an updated minimum uncompressed value and an updated maximum uncompressed value. The processing device can be further configured to rescale the set of control points based on the updated minimum uncompressed value and the updated maximum uncompressed value such that a first rescaled control point is located at the updated minimum uncompressed value, and a last rescaled control point is located at the updated maximum uncompressed value. The processing device can be further configured to readjust at least one rescaled control point of the rescaled set of control points such that an updated slope of a set of updated slopes is less than or equal to 1.

Example 18 is one or more non-transitory machine-readable mediums storing instructions. When executed by one or more processors, the instructions may cause a compression and/or decompression process to be carried out to obtain a first set of control points specifying a first set of compression ratios corresponding to respective first regions of a compression domain. The instructions may further cause the compression and/or decompression process to be carried out to obtain a minimum uncompressed value within the compression domain. The instructions may further cause the compression and/or decompression process to be carried out to obtain a maximum uncompressed value within the compression domain. The instructions may further cause the compression and/or decompression process to be carried out to scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value. The instructions may further cause the compression and/or decompression process to be carried out to adjust at least one scaled control point of the scaled set of control points to obtain an adjusted scaled set of control points such that a slope of a set of slopes among the adjusted scaled set of control points is less than or equal to 1. The instructions may further cause the compression and/or decompression process to be carried out to map between the compression domain and a range of compressed values. To map can comprise to compress from the compression domain into the range of compressed values, or to decompress from the range of compressed values into the compression domain. To map can be based on a respective compression ratio corresponding to a respective slope of the set of slopes.

Example 19 includes the non-transitory machine-readable medium of Example 18, wherein to adjust the at least one scaled control point comprises to increase a location of the at least one scaled control point such that the slope substantially equals 1.

Example 20 includes the non-transitory machine-readable medium of Example 18 or 19, wherein a respective control point of the scaled set of control points can comprise a respective location corresponding to an uncompressed value within the compression domain, and a respective compressed value within the range of compressed values. A respective slope of the set of slopes can correspond to a difference between the respective compressed value and a previous value divided by a difference between the respective location and a previous location.

The foregoing description of the embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:
1. A method of compression and/or decompression, the method comprising:
   obtaining a set of pixel values;
   obtaining a first set of control points specifying a first set of compression ratios corresponding to respective first regions of a compression domain for the pixel values;
   obtaining a minimum uncompressed value within the compression domain;
   obtaining a maximum uncompressed value within the compression domain;
   scaling the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value;

adjusting at least one scaled control point of the scaled set of control points to obtain an adjusted scaled set of control points such that a slope of a set of slopes among the adjusted scaled set of control points is less than or equal to 1;

mapping between the compression domain for the pixel values and a range of compressed values, wherein mapping comprises compressing from the compression domain into the range of compressed values, or decompressing from the range of compressed values into the compression domain; and obtaining an updated minimum uncompressed value and an updated maximum uncompressed value;

rescaling the scaled set of control points based on the updated minimum uncompressed value and the updated maximum uncompressed value to obtain a rescaled set of control points, wherein a first rescaled control point is located at the updated minimum uncompressed value, and a last rescaled control point is located at the updated maximum uncompressed value; and readjusting at least one rescaled control point of the rescaled set of control points such that an updated slope of a set of updated slopes among the rescaled set of control points is less than or equal to 1.

2. The method of claim 1, wherein adjusting the at least one scaled control point comprises increasing a location of the at least one scaled control point such that the slope substantially equals 1.

3. The method of claim 1, further comprising decreasing a location of the at least one scaled control point such that an average slope between the at least one scaled control point and the last scaled control point substantially equals 1.

4. The method of claim 1, wherein the slope is a first slope, and adjusting the at least one scaled control point further comprises adjusting a plurality of scaled control points such that the first slope and a second slope of the set of slopes are less than or equal to 1.

5. The method of claim 1, wherein:
the adjusted scaled set of control points specifies an adjusted scaled set of compression ratios corresponding to respective adjusted scaled regions of the compression domain;
a respective adjusted scaled compression ratio of the adjusted scaled set of compression ratios is substantially proportional to a respective slope of the set of slopes; and
mapping between the compression domain and the range of compressed values comprises mapping between a respective adjusted scaled region and the range of compressed values according to a respective adjusted scaled compression ratio corresponding to the respective adjusted scaled region.

6. The method of claim 1, wherein a respective control point of the scaled set of control points comprises:
a respective location corresponding to an uncompressed value within the compression domain; and
a respective compressed value within the range of compressed values.

7. The method of claim 6, wherein a respective slope of the set of slopes corresponds to a difference between the respective compressed value and a previous value divided by a difference between the respective location and a previous location.

8. The method of claim 1, wherein scaling the set of control points comprises linearly scaling the set of control points.

9. An imaging system, comprising:
an imaging device configured to obtain a set of pixel values; and
a processing device configured to
obtain a first set of control points specifying a first set of compression ratios corresponding to respective first regions of a compression domain for the pixel values;
obtain a minimum uncompressed value within the compression domain;
obtain a maximum uncompressed value within the compression domain;
scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value;
adjust at least one scaled control point of the scaled set of control points to obtain an adjusted scaled set of control points such that a slope of a set of slopes among the adjusted scaled set of control points is less than or equal to 1;
map between the compression domain for the pixel values and a range of compressed values, wherein to map comprises
to compress from the compression domain into the range of compressed values, or
to decompress from the range of compressed values into the compression domain; and
obtain an updated minimum uncompressed value and an updated maximum uncompressed value;
rescale the set of control points based on the updated minimum uncompressed value and the updated maximum uncompressed value such that a first rescaled control point is located at the updated minimum uncompressed value, and a last rescaled control point is located at the updated maximum uncompressed value; and
readjust at least one rescaled control point of the rescaled set of control points such that an updated slope of a set of updated slopes is less than or equal to 1.

10. The imaging system of claim 9, wherein to adjust the at least one scaled control point comprises to increase a location of the at least one scaled control point such that the slope substantially equals 1.

11. The imaging system of claim 9, wherein the processing device is further configured to decrease a location of the at least one scaled control point such that an average slope between the at least one scaled control point and the last scaled control point substantially equals 1.

12. The imaging system of claim 9, wherein the slope is a first slope, and to adjust the at least one scaled control point further comprises to adjust a plurality of scaled control points such that the first slope and a second slope of the set of slopes are less than or equal to 1.

13. The imaging system of claim 9, wherein:
the adjusted scaled set of control points specifies an adjusted scaled set of compression ratios corresponding to respective adjusted scaled regions of the compression domain;
a respective adjusted scaled compression ratio of the adjusted scaled set of compression ratios is substantially proportional to a respective slope of the set of slopes; and to map between the compression domain and the range of compressed values comprises to map between a respective adjusted scaled region and the range of compressed values according to a respective adjusted scaled compression ratio corresponding to the respective adjusted scaled region.

14. The imaging system of claim 9, wherein a respective control point of the scaled set of control points comprises:
a respective location corresponding to an uncompressed value within the compression domain; and
a respective compressed value within the range of compressed values.

15. The imaging system of claim 14, wherein a respective slope of the set of slopes corresponds to a difference between the respective compressed value and a previous value divided by a difference between the respective location and a previous location.

16. One or more non-transitory machine-readable mediums storing instructions that when executed by one or more processors cause a compression and/or decompression process to be carried out to:
obtain a set of pixel values;
obtain a first set of control points specifying a first set of compression ratios corresponding to respective first regions of a compression domain for the pixel values;
obtain a minimum uncompressed value within the compression domain;
obtain a maximum uncompressed value within the compression domain;
scale the first set of control points based on the minimum uncompressed value and the maximum uncompressed value to obtain a scaled set of control points, wherein a first scaled control point of the scaled set of control points is located at the minimum uncompressed value, and a last scaled control point of the scaled set of control points is located at the maximum uncompressed value;
adjust at least one scaled control point of the scaled set of control points to obtain an adjusted scaled set of control points such that a slope of a set of slopes among the adjusted scaled set of control points is less than or equal to 1;
map between the compression domain for the pixel values and a range of compressed values,
wherein to map comprises
to compress from the compression domain into the range of compressed values, or
to decompress from the range of compressed values into the compression domain, and
wherein to map is based on a respective compression ratio corresponding to a respective slope of the set of slopes; and
obtain an updated minimum uncompressed value and an updated maximum uncompressed value;
rescale the set of control points based on the updated minimum uncompressed value and the updated maximum uncompressed value such that a first rescaled control point is located at the updated minimum uncompressed value, and a last rescaled control point is located at the updated maximum uncompressed value; and
readjust at least one rescaled control point of the rescaled set of control points such that an updated slope of a set of updated slopes is less than or equal to 1.

17. The one or more non-transitory machine-readable mediums of claim 16, wherein to adjust the at least one scaled control point comprises to increase a location of the at least one scaled control point such that the slope substantially equals 1.

18. The one or more non-transitory machine-readable mediums of claim 16, wherein a respective control point of the scaled set of control points comprises:
a respective location corresponding to an uncompressed value within the compression domain; and
a respective compressed value within the range of compressed values; and
wherein a respective slope of the set of slopes corresponds to a difference between the respective compressed value and a previous value divided by a difference between the respective location and a previous location.

* * * * *